US006098950A

United States Patent [19]

Zupan et al.

[11] Patent Number: 6,098,950

[45] Date of Patent: Aug. 8, 2000

[54] ADJUSTABLE ACCESSORY MOUNTING SYSTEM FOR AUTOMOBILE MOTOR

[76] Inventors: Frank J. Zupan, 175 Summit Dr.; Terrance D. Zupan, 2276 N. San Gorgonio, both of Banning, Calif. 92220

[21] Appl. No.: 09/021,794

[22] Filed: Feb. 11, 1998

Related U.S. Application Data

[60] Provisional application No. 60/037,587, Feb. 11, 1997.

[51] Int. Cl.[7] .......... F16M 9/00

[52] U.S. Cl. .......... 248/674; 248/274.1; 123/195 A; 310/91

[58] Field of Search .......... 248/646, 674, 248/675, 279.1, 285.1, 286.1, 287.1, 295.11, 298.1, 223.41, 225.11, 274.1; 310/91; 123/195 A; 417/362

[56] References Cited

U.S. PATENT DOCUMENTS

| | | | |
|---|---|---|---|
| 1,543,455 | 6/1925 | Sparks | 248/298.1 |
| 3,018,667 | 1/1962 | Spietz | 123/195 A X |
| 3,361,513 | 1/1968 | Pantazos | 248/286.1 X |
| 4,215,658 | 8/1980 | Smith, Jr. et al. | 123/195 A X |
| 4,460,141 | 7/1984 | Svensson | 248/223.41 X |
| 4,506,522 | 3/1985 | Swaney et al. | 417/362 X |
| 4,570,887 | 2/1986 | Banister | 248/223.41 X |
| 4,678,953 | 7/1987 | Johnson | 310/91 |
| 4,922,151 | 5/1990 | Lewis | 310/91 |
| 5,836,559 | 11/1998 | Ronci | 248/230.1 X |

*Primary Examiner*—Ramon O. Ramirez
*Attorney, Agent, or Firm*—Knobbe, Martens, Olson & Bear, LLP

[57] ABSTRACT

Disclosed is an adjustable accessory mounting bracket for mounting an accessory to an engine including a main body and accessory mounting portion that is movably attached thereto. The accessory mounting portion is configured to removably support an engine accessory, such as an air conditioning compressor or an alternator. The accessory mounting portion is slidably attached to the main body in such a manner that the position of the accessory mounting portion relative to the main body is adjustable in a predetermined direction. The accessory mounting bracket also includes at least one mounting aperture that may be aligned with an existing aperture on an engine for mounting the bracket to the engine.

23 Claims, 5 Drawing Sheets

ADJUSTABLE ACCESSORY MOUNTING SYSTEM FOR AUTOMOBILE MOTOR

RELATED APPLICATIONS

This application claims the benefit of U.S. Provisional Application No. 60/037,587, filed on Feb. 11, 1997.

BACKGROUND OF THE INVENTION

1. Field of the Invention

The present invention relates to a mounting system for adjustably mounting an accessory to an automobile engine. More particularly, the present invention relates to an improved bracket for mounting an accessory to an automobile engine where the position of the accessory is adjustable in a predetermined direction relative to the engine.

2. Description of the Related Art

Hot rods are automobiles that are adjusted or rebuilt for high performance, such as quick acceleration and great speed. It is very common for hot rods to be assembled from older model automobiles. Unfortunately, many older model automobile parts are in short supply and therefore difficult to obtain. Consequently, hot rods are often assembled using a collection of parts from different models and different years. The parts often have to be rebuilt or machined in order to correctly fit together. Because of the rebuilt nature of hot rod engine, there are many difficulties associated with mounting new accessories, such an alternator or air conditioning compressor, to the engine.

One such difficulty involves mounting an accessory that is driven by a belt that is coupled to a pulley on the engine drive shaft. When installing such an accessory, an installer must adjust the position of the device so that the device is correctly aligned with the plane in which the associated pulley rotates so that the belt rotates smoothly. If the belt is not correctly aligned between the accessory and the pulley, the accessory may vibrate during operation which can damage the engine or reduce engine performance. Moreover, if the belts are not correctly aligned between the device and the engine, the belts may break or throw themselves from the engine. Unfortunately, current accessory mounts do not provide the installer with a way of easily adjusting the position of the mount relative to the engine.

Installation of engine accessories to a hot rod engine is also time consuming and inconvenient. Because a hot rod engine is often assembled from a collection of parts from different engine manufacturers and models, these engines do not have mounting holes that are dedicated to the mounting of newer parts, such as an air conditioner or alternator. Consequently, an installer must typically drill mounting holes onto the engine in order to install the new part. The installer thus risks damaging the engine while drilling the holes, such as by breaking into water passages within the engine. Moreover, the installer must often remove certain parts of the engine, such as the engine heads, prior to drilling, which is time-consuming.

There is therefore a need for a device that can be used to mount accessories, such as air conditioning units or alternators, onto a hot rod automobile engine where the position of the device is adjustable in a predetermined direction so that belts and pulleys that drive the accessory may be aligned for optimal operation. An installer should be able to easily mount the device without having to drill mounting holes in the engine.

SUMMARY OF THE INVENTION

The aforementioned needs are satisfied by the present invention, which is an adjustable mounting bracket that is used to mount an accessory, such as an air conditioning unit or an alternator, to an automobile engine.

In one aspect of the invention, a mounting bracket is configured to be removably attached to an engine. The mounting bracket acts as a mount to which an engine accessory, such as an alternator or an air conditioning unit, may be attached. The bracket is advantageously adjustable in a direction that allows the installer to correctly align the accessory with an associated belt and pulley on the engine. Preferably, this allows the installer to mount the accessory to the engine so that vibration caused by the belt is reduced.

In another aspect of the invention, one or more mounting holes are located on the bracket. The mounting holes are positioned such that the bracket may be mounted to an automobile engine using pre-existing holes that are located on a standard engine. Hence, an installer does not have to drill holes into the engine in order to mount the bracket to the engine.

In accordance with one embodiment of the invention, there is disclosed an adjustable accessory mounting bracket for mounting an accessory to an engine including a main body and accessory mounting portion that is movably attached thereto. The accessory mounting portion is configured to removably support an engine accessory, such as an air conditioning compressor or an alternator. The accessory mounting portion is slidably attached to the main body in such a manner that the position of the accessory mounting portion relative to the main body is adjustable in a predetermined direction. The accessory mounting bracket also includes at least one mounting aperture that may be aligned with an existing aperture on an engine for mounting the bracket to the engine.

Thus, the present invention is a device that may be used to adjustably mount an accessory to an automobile engine. The device may be mounted onto pre-existing holes on a standard motor so that an installer does not have to drill holes in order to mount the device. Moreover, the position of the device relative to the engine is adjustable so that an installer can correctly align the accessory with associated belts with pulleys on the engine.

BRIEF DESCRIPTION OF THE DRAWINGS

These and other features of the invention will now be described with reference to the drawings of a preferred embodiment of the invention which is intended to illustrate and not to limit the invention and in which.

DETAILED DESCRIPTION OF THE PREFERRED EMBODIMENT

Figure 1:
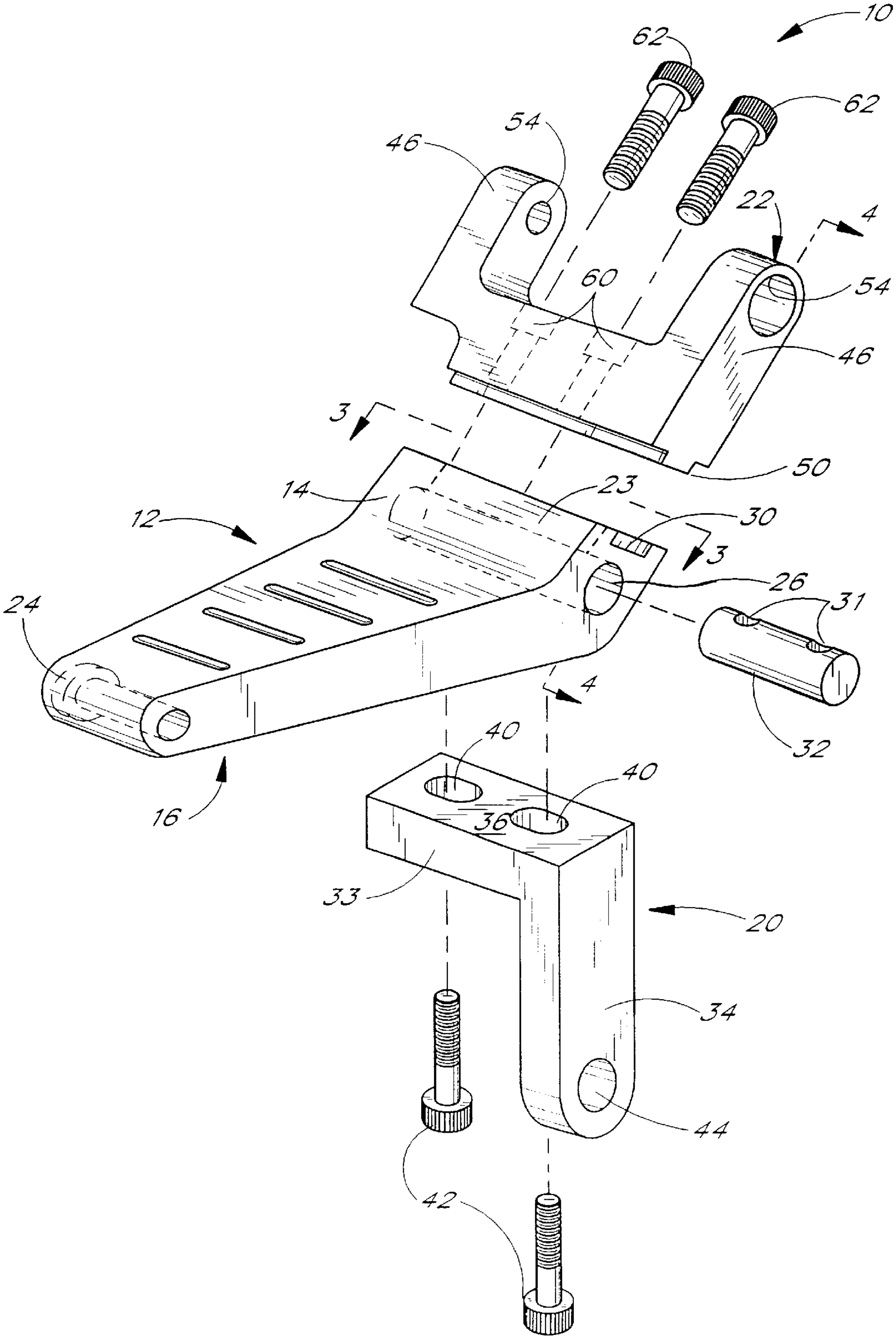
FIG. 1 is a perspective view of a mounting bracket of the present invention.

FIG. 1 illustrates a perspective view of a mounting bracket 10 configured in accordance with one embodiment of the present invention. The mounting bracket 10 includes a main body 12 having a top surface 14 and a bottom surface 16. The mounting bracket 10 also includes an engine mount 20 and an accessory mount 22 slidably attached to the main body 12, as further described below. The main body 12 and the engine mount could also be combined to collectively comprise an engine mounting member. It will be appreciated that the terms "top" and "bottom" are with respect to the illustrations included herein and are not intended to limit the scope of the invention. Furthermore, those skilled in the art will appreciate that the particular shape of the mounting bracket 10 may be varied while remaining within the scope of the present invention.

Figure 2:
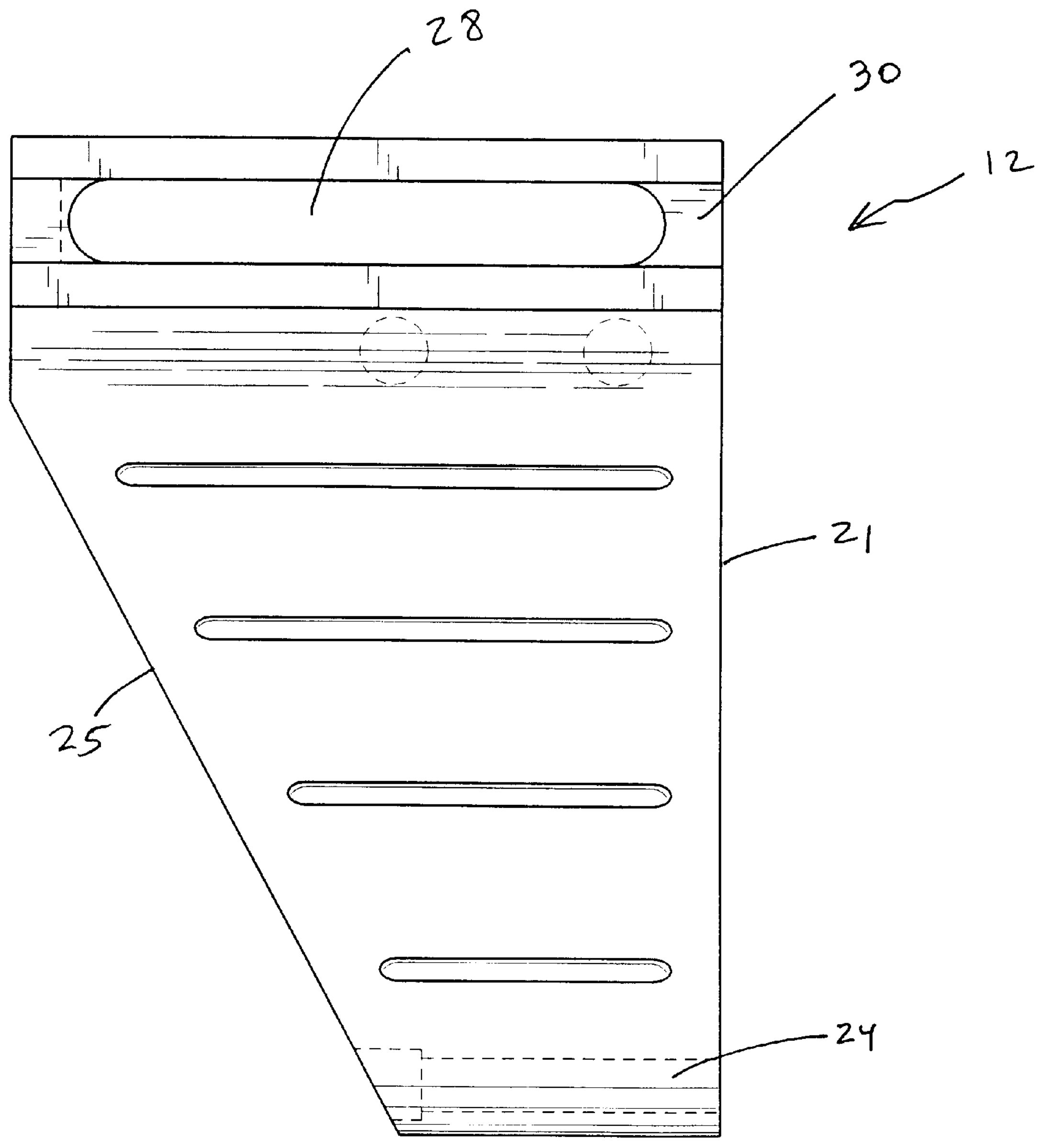
FIG. 2 is a top plan view of a main body of the mounting bracket of the present invention.

With reference to FIGS. 1 and 2, the main body 12 has a substantially elongated shape with an angled portion 23 oriented at an angle relative to the rest of the main body 10. As best shown in FIG. 2, the illustrated embodiment of the main body 12 has a first side edge 21 and a second side 25 oriented at an angle with respect to the first side edge 21. The mounting bracket 10 desirably includes an attachment mechanism that allows the engine mount to slide relative to the main body 12. In the illustrated embodiment, an adjuster shaft 26 extends either partially or entirely through the main body 12 where the angled portion 23 begins to angle away from the main body 10. The adjuster shaft 26 is shaped to slidably receive a slide member of corresponding shape, such as a slide key 32. As illustrated in FIG. 1, two threaded apertures 31 extend into the slide key 32.

A mounting shaft 24 also extends through the main body 12 at the end opposite the location of the adjuster shaft 26. In the illustrated embodiment, the mounting shaft 24 is oriented along an axis that is substantially parallel to the axis of the adjuster shaft 26.

As best shown in FIGS. 1 and 2, a receiving channel or slot 30 extends across one end of the main body 12 on the angled portion 23. The receiving slot 30 extends in substantially the same direction as the adjuster shaft 26. An elongated aperture 28 (FIG. 2), having a length that is less than that of the adjuster shaft 26, is aligned with the adjuster shaft 26 and places the adjuster shaft 26 in communication with the receiving slot 30.

With reference again to FIG. 1, the engine mount 20 includes an abutment portion 33 and a connector portion 34 oriented substantially perpendicular to the abutment portion 33 so that the engine mount 20 has a substantially upside-down "L"-shape. An abutment surface 36 on the abutment portion 33 is configured to contact the bottom surface 16 of the main body 12 when the engine mount 20 is removably attached to the main body 12. Two apertures 40 extend through the abutment portion 33 of the engine mount 20. The apertures 40 are each configured to receive a securing device 42, such as, for example, a bolt. The securing device 42 may be used to removably mount the engine mount 20 to the main body 12. An engine mounting aperture 44 extends through the end of the connector portion 34 on the engine mount 20.

Referring to FIG. 1, the mounting bracket 10 also includes an accessory mount 22 that is configured to support an engine accessory, as described more fully below. The accessory mount 22 includes two arms or prongs 46 defining a space that is sized to receive an engine accessory and provide the accessory mount 22 with a substantially "U"-shape. An elongated attachment rail 50 extends outward from one end of the accessory mount 22. The attachment rail 50 has a cross-sectional shape that substantially conforms to the cross-sectional shape of the receiving slot 30 in the main body 12. The attachment rail 50 is configured to be slidably inserted into the receiving slot 30. It will be appreciated that the cross-section of the attachment rail 50 and the receiving slot 30 may define any wide variety of shapes that are configured to slidably mate with one another.

Two mounting apertures 54 extend through the tips of the prongs 46. The mounting apertures 54 are co-axially aligned. Additionally, two shafts 60 extend through the engine mount 20 between the prongs 46. The shafts 60 are each configured to receive a securing device 62, such as bolts, as shown in the illustrated embodiment. The shafts 60 are preferably spaced apart by a distance equal to the distance between the apertures 31 on the slide key 32.

With reference to FIG. 1, the mounting bracket 10 is assembled in the following manner. The engine mount 20 is attached to the bottom surface 16 of the main body 12 using the securing devices 42, which are inserted through the apertures 40 and into corresponding threaded apertures on the bottom surface of the main body 10. The slide key 32 is then inserted into the adjuster shaft 26 so that the apertures 31 in the slide key 32 are oriented toward the receiving slot 30 and are visible through the elongated aperture 28 (FIG. 2).

Figure 3B:
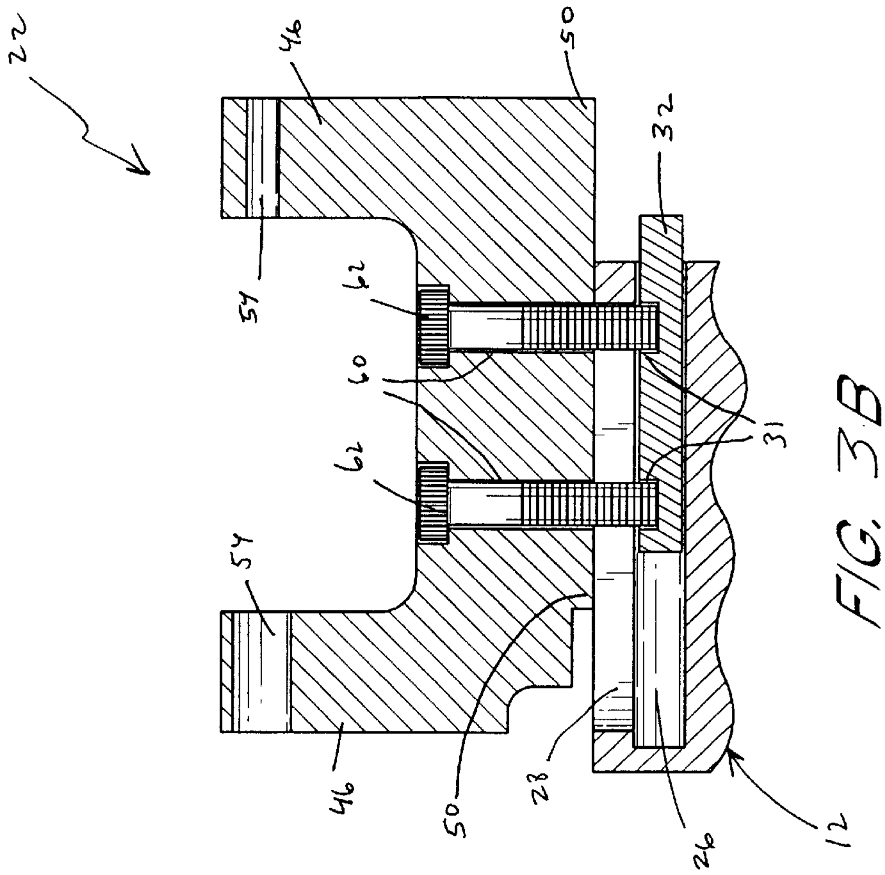
FIG. 3B is a cross-sectional view of the mounting bracket in a second sliding position.
Figure 3A:
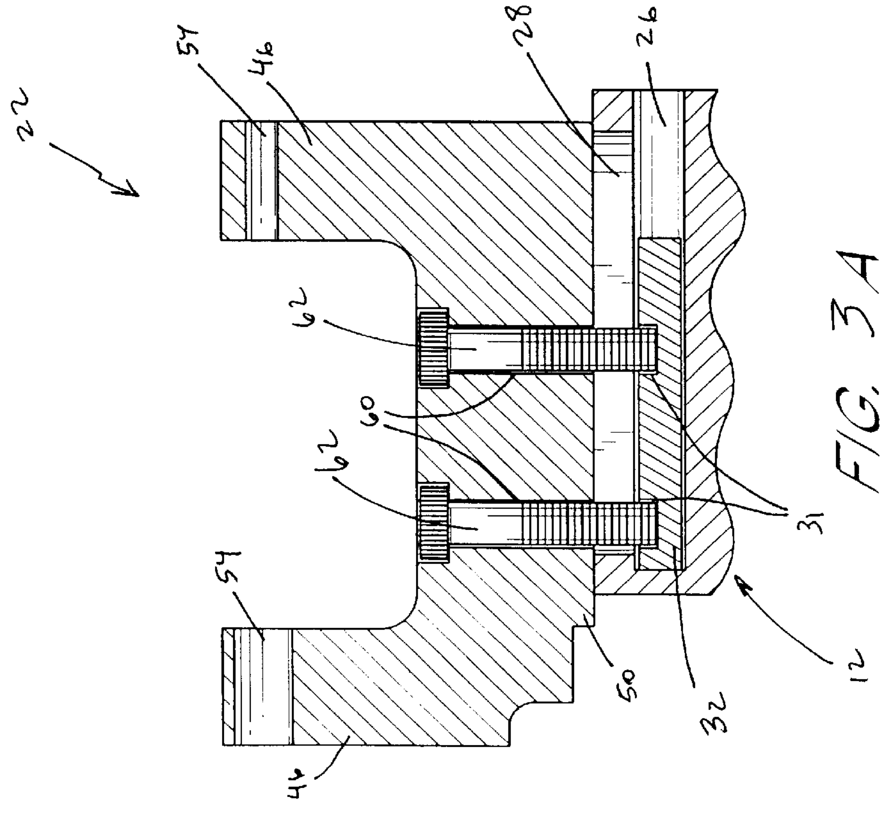
FIG. 3A is a cross-sectional view of the mounting bracket in a first sliding position.

With reference to FIGS. 3A and 3B, the accessory mount 22 is then attached to the main body 12 by slidably inserting the attachment rail 50 into the receiving slot 30. The position of the accessory mount 22 relative to the main body 12 may be adjusted by sliding the attachment rail 50 of the accessory mount 22 within the receiving slot 30 of the main body 12 so that the slide key 32 also slides within the adjuster shaft 26. The accessory mount 22 is preferably positioned with respect to the slide key 32 so that the two shafts 60 axially align with the two apertures 31 in the slide key 32. The securing devices 62 are then inserted into the shafts 60 and screwed into the apertures 31 within the slide key 32. The securing devices 62 are then tightened to thereby secure the slide key 32 tightly within the adjuster shaft 26 and secure the accessory mount 22 onto the main body 12. In particular, the securing devices 62 are tightened against the slide key 32 thereby pressing the outer surface of the slide key 32 against the inner wall of the adjuster shaft 26. As the securing devices 62 are tightened, the frictional forces between the outer surface of the slide key 32 and the inner wall of the adjuster shaft 26 are increased thereby reducing the likelihood of movement of the slide key 32 within the shaft 26.

With reference to FIGS. 3A and 3B, the securing devices 62 are loosened to allow adjustment of the position of the accessory mount 22 relative to the main body 12 in a first direction. That is, the accessory mount 22 is slidable relative to the main body 12 along the length of the receiving slot 30. The attachment rail 50 slides along and within the receiving slot 30. The securing devices 62 act as stops which abut against either end of the elongated aperture 28 and prevent the accessory mount 22 from sliding entirely out of the receiving slot 30. When the desired position of the accessory mount 22 is obtained along the axis defined by the receiving slot 30, the securing devices 62 are tightened to thereby press the accessory mount 22 against the main body 12 and secure the position of the accessory mount 22 in a desired position with respect to the main body 12 of the accessory.

Figure 4:
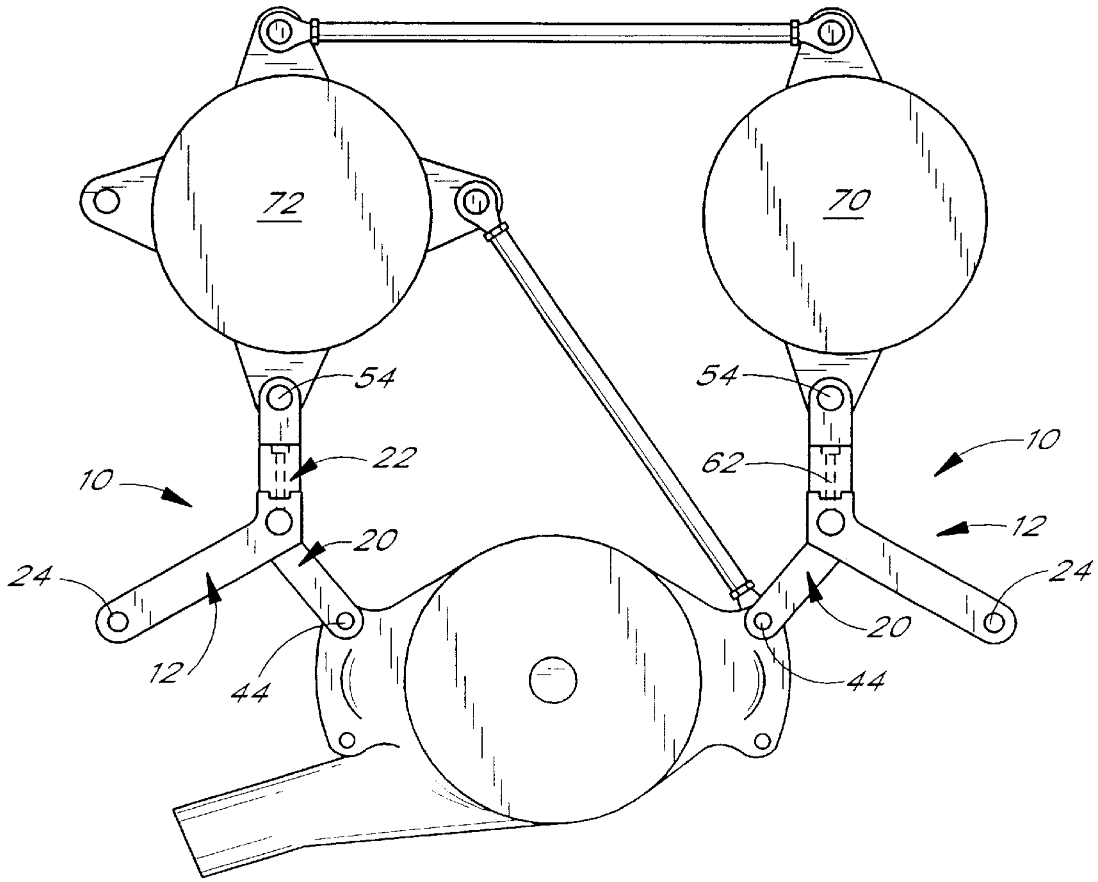
FIG. 4 schematically shows the mounting bracket of the present invention as mounted on an engine.

FIG. 4 schematically illustrates how the mounting bracket 10 may be used to attach an accessory, such as an alternator 70 or air conditioning compressor 72, to a motor. The mounting bracket 10 as illustrated herein is particularly suited to be mounted onto a Chevrolet engine block. However, it will be appreciated that the configuration of the mounting bracket 10 and the placement of the mounting shaft 24 and mounting apertures 44, 54, may vary widely so as to be used with different engines.

With reference to FIG. 4, the accessory, such as an alternator 70 or an air conditioning compressor 72, is mounted to the mounting bracket 10 using the mounting apertures 54 on the accessory mount 22. Preferably, the accessory is mounted between the prongs 46 on the accessory mount. The prongs 46 define an attachment point for the accessory, however, it will be appreciated that the exact configuration of the attachment point will vary depending upon the configuration of the accessory without departing from the spirit of the present invention.

The mounting bracket 10 may then be attached to the motor as follows. The aperture 44 on the engine mount 20 is aligned with a pre-existing hole on the engine, such as on the water pump 76. The mounting aperture 24 on the main body 12 is then aligned with another pre-existing hole on the engine, such as to the cylinder heads (not shown). Fasteners, such as bolts, are then inserted into the apertures and used to secure the mounting bracket 10 to the engine.

Figure 5:
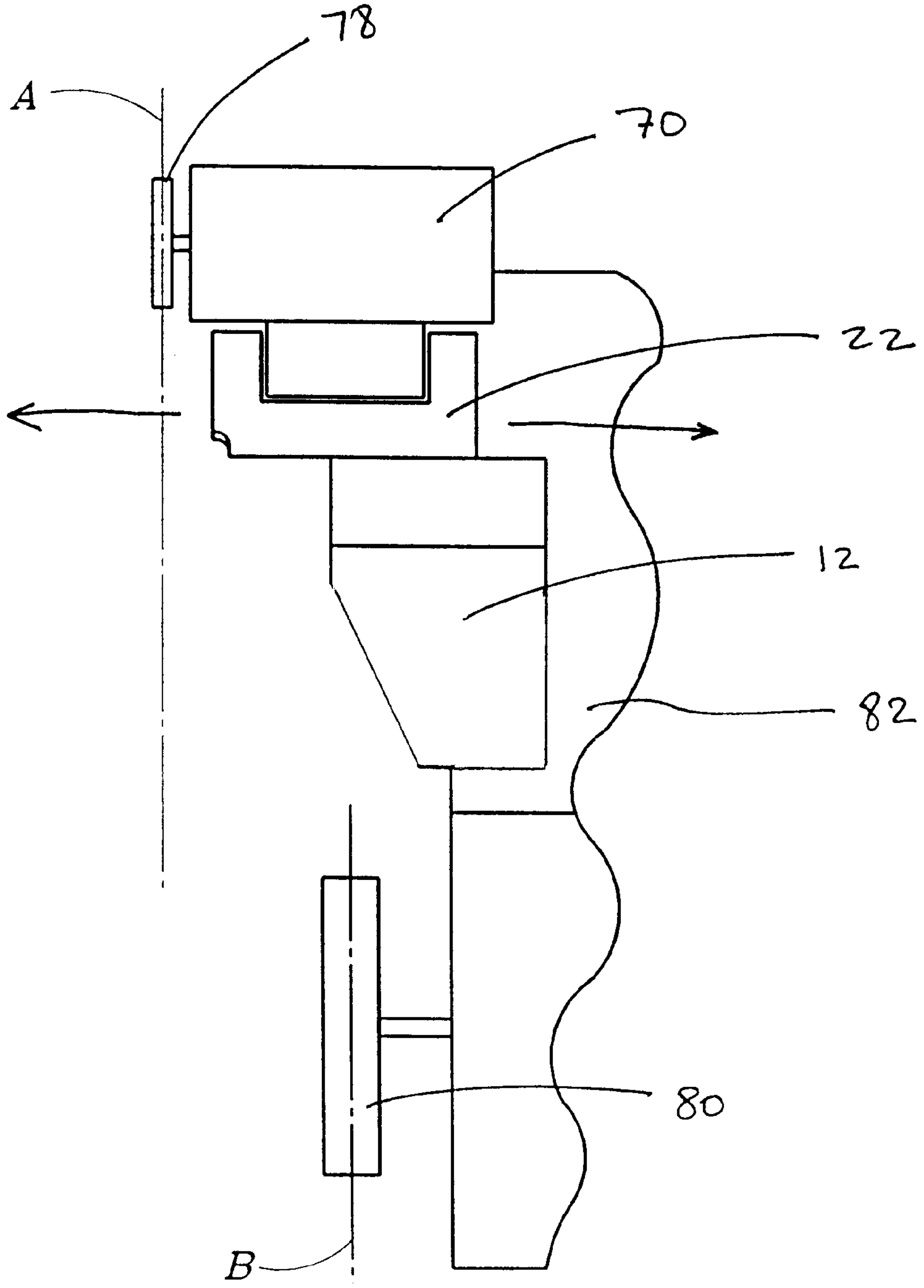
FIG. 5 is a side view of the mounting bracket attached to an engine.

In the illustrated embodiment, the alternator 70 or air conditioning compressor 72 are driven by a belt and pulley system that rotates in a plane parallel to the page in FIG. 4. As best shown in FIG. 5, the accessory includes a rotor or pulley 78 that rotates within a first plane A. The position of the rotor or pulley 78 of the accessory is desirably aligned with a second plane B, in which a drive pulley 80 on an engine 82 rotates. Desirably, the first plane A is aligned with the second plane B so that the pulley 78 on the accessory rotates within the same plane as the drive pulley 80 on the engine 82.

Advantageously, the position of the accessory may be adjusted in a first direction by sliding the attachment rail 50 of the accessory mount 22 within the receiving slot 30 on the main body 12. The first direction intersects the plane B so that the plane A may be moved to align with the plane B. The accessory mount 22 may thus be slidably moved relative to the main body and the engine 82 until plane A and plane B are aligned, or until the accessory is correctly positioned relative to the pulleys on the motor. Once correctly aligned, the securing devices 62 may be tightened against the slide key 32 to secure the accessory mount 22 to the main body 12 of the mounting bracket 10 in the desired location along the first direction to thereby lock the position of the accessory relative to the engine.

Hence, the preferred embodiment provides a device that allows for mounting of engine accessories on engines when the accessories were not originally designed for the engine. The installer simply has to install the engine mounting bracket on the engine and then mount the accessory on the accessory mounting bracket. The accessory mounting bracket is then mounted to the engine mounting bracket in an adjustable manner so that accessory can be correctly oriented with respect to the engine to permit easy installation of belts to power the accessory device. It will be appreciated that the accessory mounting device of the preferred embodiment is particularly useful for use in restoring engines. After market accessory parts can be mounted on engines and then correctly aligned by sliding the accessory mounting bracket with respect to the engine mounting bracket even though the after market accessory part was not necessarily designed to be installed on the existing engine.

Although the preferred embodiment of the present invention has shown, described, and pointed out the fundamental novel features of the invention as applied to these embodiments, it will be understood that various omissions, substitutions, and changes in the form of the detail of the device illustrated, may be made by those skilled in the art without departing from the spirit of the present invention.

What is claimed is:

1. A device for mounting an accessory to an engine having a drive pulley attached thereto, comprising:

a main body configured to be attached to the engine, the main body including a first mounting aperture that is configured to be aligned with a first pre-existing hole in the engine so that the main body can be secured to the first surface with a bolt extending in a first direction and wherein the main body defines a mounting location spaced in a second direction, transverse to the first direction;

an attachment portion mounted to the mounting location of the main body so as to be adjustable in the first direction relative to the main body, the attachment portion configured to be attached to the accessory such that the accessory can be secured in one of a plurality of locations along the first direction;

wherein the main body and the attachment portions are so dimensioned as to be attached to a portion of the engine such that the first direction intersects a plane of rotation of the drive pulley of the engine when the main body is attached to the engine so that the attachment portion may be moved so as to align the accessory with the plane of rotation of the pulley when the main body is attached to the engine.

2. The device of claim 1, additionally comprising an attachment body attached to the main body, the attachment body including at least one mounting aperture that may be aligned with a second pre-existing hole on the engine when the first mounting aperture on the main body is aligned with the first pre-existing hole on the engine.

3. The device of claim 1, wherein the attachment portion is slidably adjustable in the first direction relative to the main body.

4. The device of claim 3, wherein the main body includes an elongated channel having a cross-sectional shape, and wherein the attachment portion includes an elongated rail configured to slidably mate with the elongated channel on the main body.

5. The device of claim 4, wherein the cross-sectional shape of the elongated rail substantially conforms to the cross-sectional shape of the elongated channel.

6. The device of claim 1, additionally comprising an attachment mechanism that interconnects the main body and the attachment portion so as permit the main body to slidably move relative to the attachment portion.

7. The device of claim 6, additionally comprising a key mounted within a shaft in the main body so as to be slidable in the first direction, and a fastening device coupled to the attachment portion, the fastening device being configured to mate with the key to thereby slidably secure the attachment portion to the main body.

8. The device of claim 7, wherein the key includes an aperture sized to receive the fastening device, and wherein the attachment portion includes a shaft sized to receive the fastening device so that the fastening device is positionable within the aperture in the key when the shaft in the attachment portion is aligned with the aperture in the key, and wherein the fastening device is configured to be secured within the aperture in the key to thereby fix the position of the attachment portion along the first direction.

9. The device of claim 1, wherein the first direction is normal to the plane of rotation of the drive pulley of the engine.

10. The device of claim 1, wherein the attachment portion includes a pair of arms defining a space therebetween, and wherein the space is sized to receive the accessory.

11. An adjustable accessory mounting bracket for mounting an accessory to an engine, in combination with the engine, the combination comprising:

the engine having a drive pulley that rotates in a plane of rotation;

a main body including at least one mounting aperture that may be aligned with an existing aperture on the engine for mounting the bracket to the engine;

an accessory mounting portion movably attached to the main body, wherein the accessory mounting portion is configured to removably support an engine accessory and wherein the accessory mounting portion is movably attached to the main body in such a manner that the position of the accessory mounting portion relative to the main body is adjustable in a predetermined direction and wherein the main body and the accessory mounting portion are so dimensioned that when the main body is mounted on the engine, the accessory is mounted on the accessory mounting portion, the accessory is movable in the pre-determined direction that intersects the plane of rotation of the drive pulley on the engine.

12. The combination of claim 11, wherein the predetermined direction is substantially perpendicular to the plane of rotation of the drive pulley on the engine.

13. The combination of claim 12, wherein the main body includes an elongated channel, and wherein the accessory mounting portion includes a rail configured to slidably mate with the elongated channel.

14. The combination 11, wherein the accessory mounting portion is movably attached to the main body so as to be slidable with respect to the main body.

15. The combination of claim 11, additionally comprising a slide member coupled to the main body, and a fastening device coupled to both the accessory mounting portion and the slide member so that the accessory mounting portion slides relative to the main body in both the predetermined direction and the opposite direction.

16. The combination of claim 11, wherein the main body includes an engine mounting portion including at least one mounting aperture that may be aligned with an existing aperture on an engine when the main body is mounted to the engine.

17. A method of attaching an accessory to an engine so as to allow adjustment of the accessory in a first direction, comprising:

attaching the accessory having a rotor to a first portion of a mounting device;

attaching a second portion of the mounting device to the engine so that the accessory is spaced in a second direction, transverse to the first direction from the attachment point between the second portion of the mounting device and the engine;

sliding the first portion of the mounting device with respect to the second portion in the first direction relative to a second portion of the mounting device so that the rotor on the accessory is moved in a direction perpendicular to a plane of rotation of a drive pulley of the engine such that the rotor is positioned within the same plane as the drive pulley.

18. The method of claim 17, additionally comprising locking the position of the first portion of the mounting device relative to the position of the second portion of the mounting device.

19. The method of claim 17, additionally comprising aligning a mounting hole on the mounting device to a preexisting hole on the engine.

20. A device for mounting an accessory to an engine, comprising:

an engine mounting member, that is adapted to be secured to existing apertures in an engine wherein the engine mounting member has a first aperture formed therein adjacent a first surface of the engine mounting member that extends parallel to the first surface and wherein an elongate opening is formed in the first surface so as to communicate with the first aperture;

an accessory mounting member that defines an attachment point for an accessory component wherein the accessory mounting member is coupled to the engine mounting member so as to allow the accessory mounting member to be slidably engaged with the engine mounting member over a range of motion in a first direction and secured in one of a range of positions within the sliding range of motion a fastener that is attached to the accessory mounting member so as to extend through the opening into the aperture of the engine mounting member when the accessory mounting member is positioned adjacent the first surface of the engine mounting member; and a slide key member that is positioned within the aperture so as to be slidable within the aperture, wherein the fastener engages with the slide key member so that the assembly member is slidably attached to the first surface of the engine mounting member as a result of the fastener sliding within the elongate opening and the slide key member sliding within the aperture and wherein the fastener is adapted to be tightened against the slide key member so that the accessory mounting member can be secured to the engine mounting member in a first position on the first surface wherein the tightening of the fastener results in the slide key member frictionally engaging with the inner walls of the first aperture so as to prevent sliding motion of the slide key member within the first aperture.

21. The device of claim 20, wherein the first surface of the engine mounting member has a channel formed therein and the accessory mounting member has an attachment rail formed on a first surface of the accessory mounting member wherein the attachment rail is adapted to be positioned within the channel formed on the first surface when the accessory mounting member is fastened to the first surface of the engine mounting member.

22. The device of claim 21, wherein the channel formed on the first surface of the engine mounting member and the attachment rail formed on the accessory mounting member to permit relative movement between the engine mounting member and the accessory mounting member only in the first direction when the attachment rail is positioned in the channel.

23. The device of claim 22, wherein the fastener extends through the attachment rail into the channel and the elongate opening formed in the engine mounting member is formed so as to be positioned within the channel.

* * * * *